United States Patent [19]

Godbersen

[11] 3,917,087

[45] Nov. 4, 1975

[54] BOAT SUPPORTING APPARATUS

[76] Inventor: Byron L. Godbersen, 710 Circle Drive, Ida Grove, Iowa 51445

[22] Filed: July 19, 1974

[21] Appl. No.: 490,182

[52] U.S. Cl.............. 214/84; 193/35 C; 280/414 R
[51] Int. Cl.² ......................................... B60P 3/10
[58] Field of Search..................... 214/505, 506, 84; 280/414 R; 193/35 C, 35 R, 35 MD

[56] References Cited
UNITED STATES PATENTS

| | | | |
|---|---|---|---|
| 2,822,100 | 2/1958 | Pesta................... | 214/84 X |
| 2,834,492 | 5/1958 | Roy, Sr. et al.......... | 214/505 |
| 3,058,756 | 10/1962 | Holsclaw............... | 214/506 X |
| 3,155,249 | 11/1964 | Johnson................ | 214/84 |
| 3,308,975 | 3/1967 | Desfillies.............. | 214/84 |
| 3,356,239 | 12/1967 | Klein.................. | 280/414 R X |
| 3,756,439 | 9/1973 | Johnson................ | 214/84 |
| 3,812,986 | 5/1974 | Rogers................. | 214/505 |

Primary Examiner—Albert J. Makay
Attorney, Agent, or Firm—Henderson & Strom

[57] ABSTRACT

A boat trailer having a frame, a pair of wheels, a mechanism for connecting the trailer to a prime mover, and a novel roller arrangement for loading, unloading and supporting a boat. A transverse frame member is mounted on the rear end of the frame by structure which allows a vertical adjustment of the transverse frame member. Connected to the transverse frame member is a pair of hinge members. Each hinge member is rigidly affixed to the transverse frame member, and each hinge member is also selectively movable laterally along the transverse body member. A bracket member is pivotally attached, centrally thereof, at each end of each hinge member and a U-shaped member is pivotally mounted centrally thereof at each end of each bracket member. Additionally, each end of each U-shaped member has a roller rotatably attached thereto.

10 Claims, 7 Drawing Figures

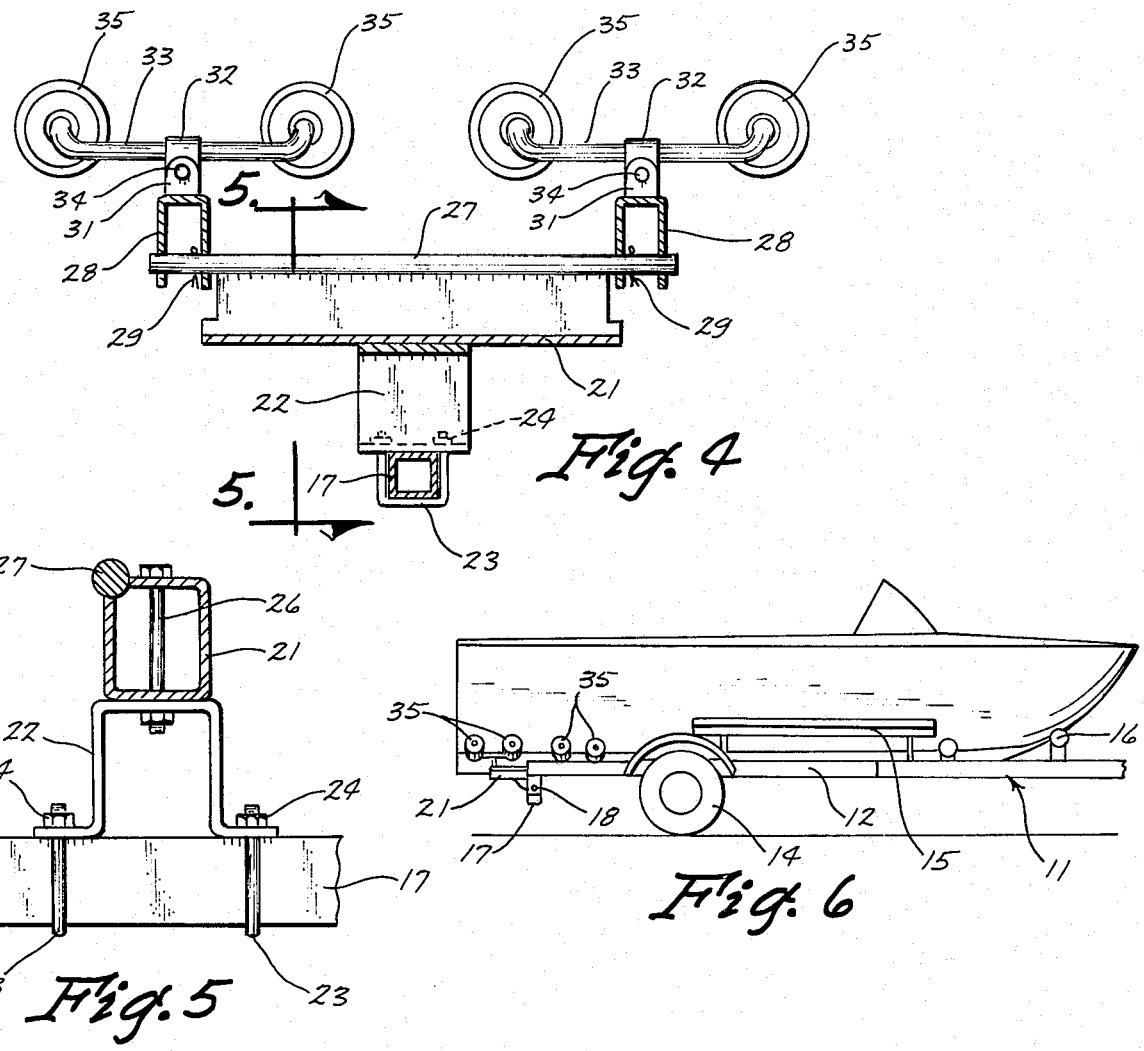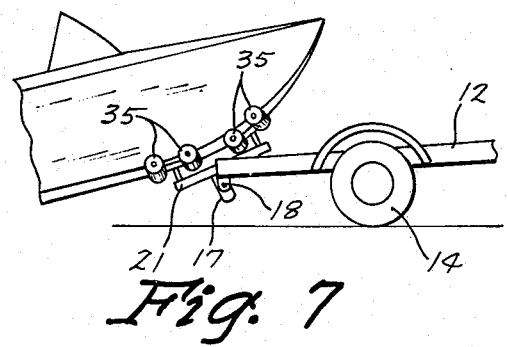

BOAT SUPPORTING APPARATUS

BACKGROUND OF THE INVENTION

The present invention relates generally to boat trailers and more particularly to a boat supporting apparatus which also functions to aid in the loading and unloading of boats onto and from a boat trailer.

Because the hull shapes of boats can be quite varied and different in design, a crucial problem has existed of trying to design a versatile boat trailer which is adaptable to transport boats of many different sizes and shapes. For some time in the art it has been known to use rollers on the rear end of a boat trailer in order to aid and facilitate the loading and unloading of boats to and from the trailer by reducing the friction between the boat and the trailer. Examples of such rollers on boat trailers can be found in U.S. Pat. Nos. 2,948,423 and 3,104,770.

It has also been found that these rollers can be made to be adjustable to conform somewhat to the particular boat being loaded on the boat trailer, for example as shown by U.S. Pat. No. 2,816,672. U.S. Pat. No. 3,756,439 shows the concept of using a rear roller support on a boat trailer which pivots along a transverse axis to thereby aid in the loading and unloading of a boat to and from a boat trailer.

While it is, then, generally known to use rollers to aid in the loading, unloading and supporting of a boat on a boat trailer, there has heretofore still existed a need to have such a roller apparatus which is moveable in both the vertical and horizontal directions. Additionally, there still existed a need to be able to automatically move the rollers to a position to support the boat when it is being loaded and unloaded, as well as to be in the proper supporting position once the boat is on the trailer in a transport position. This is particularly important when the bow or prow is sharp. In the past, adjustment of one roller or one roller unit may have answered one problem or fit one hull formation, but not another. Furthermore, most of the roller adjustments in the prior art must be done manually when moving from one hull formation to another.

An object of the present invention is to provide a support structure for a boat trailer which will easily facilitate the loading, unloading and supporting of boats of various sizes and shapes.

Another object of the present invention is to provide supporting rollers which are mounted on supporting structures which pivot around two or more axes to thereby readily and automatically adjust to various hull formations.

A further object of the present invention is to provide adjustable roller supporting structure which is supported by a transverse frame member which, in turn, is pivotally mounted along a transverse axis.

Still another object of the present invention is to provide a transverse frame member which is vertically adjustable to thereby vertically adjust the position of supporting rollers attached thereto.

A still further object of the present invention is to provide mounting structures for roller supports on a boat trailer which are transversely or laterally adjustable.

Other objects, advantages, and novel features of the present invention will become apparent from the following detailed description of the invention when considered in conjunction with the accompanying drawings.

BRIEF DESCRIPTION OF THE DRAWINGS

FIG. 4 is a cross sectional view of the support apparatus of the present invention taken along line 4—4 of FIG. 3;

FIG. 5 is a cross sectional view taken along line 5—5 of FIG. 4;

FIG. 6 is a side elevational view of a boat trailer constructed according to the present invention with a boat loaded thereon; and FIG. 7 is a side elevational view of the present invention showing a boat in the position wherein the bow portion of the hull is supported by the roller supporting apparatus of the present invention either in a position when it is being loaded or in a position when the boat is being unloaded.

DESCRIPTION OF THE PREFERRED EMBODIMENT

Figure 1:
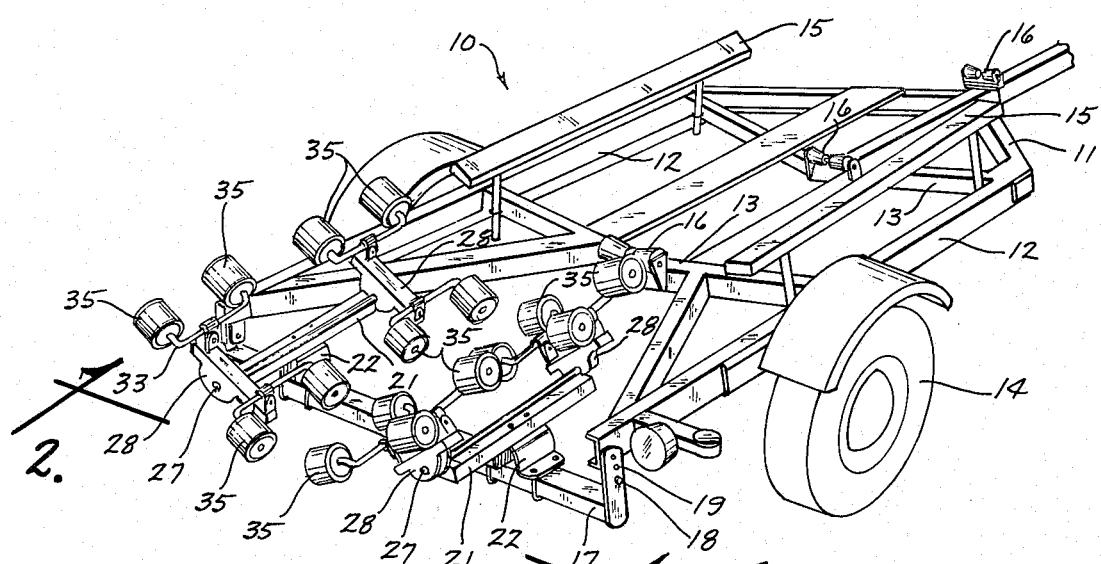
FIG. 1 is a perspective view of a preferred embodiment of the present invention.

Referring now to the drawings wherein like reference numerals designate identical or corresponding parts throughout the several views, FIG. 1 shows a perspective view of a boat trailer constructed according to the present invention. FIG. 1 shows a trailer 10 having a frame 11, to which is attached all of the supporting mechanisms for the trailer. The frame 11 has longitudinal connecting members 12 and horizontal connecting members 13. Wheels 14 are disposed on each side of the frame 11 and, of course, serve to allow movement of the trailer from place to place. Conventional bunks 15 are connected to the front portion of the trailer and can be adjustably positioned. Conventional central rollers 16 serve to aid in moving a boat longitudinally on top of the trailer with a minimum of friction.

A transverse frame member 17 is pivotally connected to the rear end of longitudinal members 12 by bolts 18. The bolts 18 are received through any one of a series of holes 19 in the transverse frame member 17 and also through a hole in a portion of each of the longitudinal connecting members 12 to thereby provide a vertical adjustment feature for the boat supporting structure of the present invention. Attached to the transverse frame member 17 are two hinge members 21, which are solidly and rigidly affixed to the transverse member 17 by the brackets 22. Each of the brackets 22 are connected to the transverse frame member 17 by a pair of U-bolts 23. Nuts 24 on each end of each U-bolt serve to form a transverse or lateral adjustment of the hinge members 21 and thereby affix the entire roller adjusting unit on each side of the trailer. Bolt and nut devices 26 (FIG. 5) serve to mount the hinge members 21 to the brackets 22.

A rod 27 is secured to each of the hinge members 21, such as by welding, and the rods 27 serve as a pivotal point for each of four bracket members 28, (FIG. 4). Cotter keys 29 hold the bracket members 28 on the rod 27.

A clevis-like structure 31 extends from each end of each bracket member 28, in which is received a metal piece 32. A somewhat U-shaped member 33 is rigidly and securely attached to the metal piece 32 and the entire unit including members 32 and 33 are pivotally attached to the clevis-like portions 31 of the bracket members 28 by bolt and nut devices 34. It is clearly shown in the drawings that there is a hinge member 21 on each side of the transverse frame member 17. On each end of each hinge member 21 is mounted a bracket member 28 as described above. On each end of each bracket member 28 is mounted, by a pivotal connection, a U-shaped member 33, and on each end of each U-shaped member is rotatably mounted a roller 35, which is preferably constructed of a hard rubber or similar rigid, yet durable, plastic material.

Figure 2:
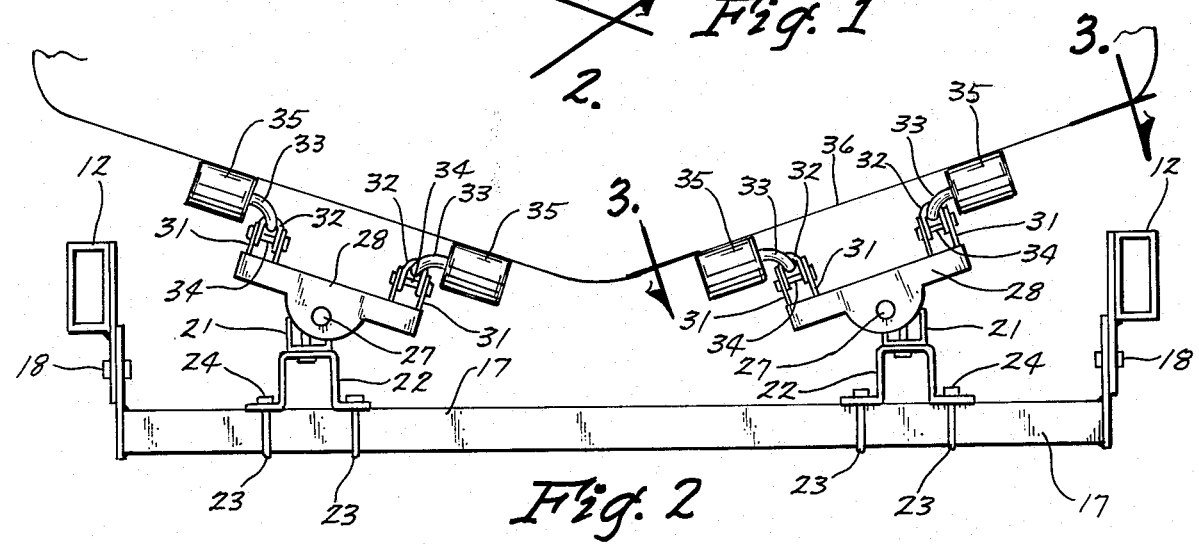
FIG. 2 is a rear end view of the trailer of FIG. 1 taken along line 2—2 of FIG. 1.
Figure 3:
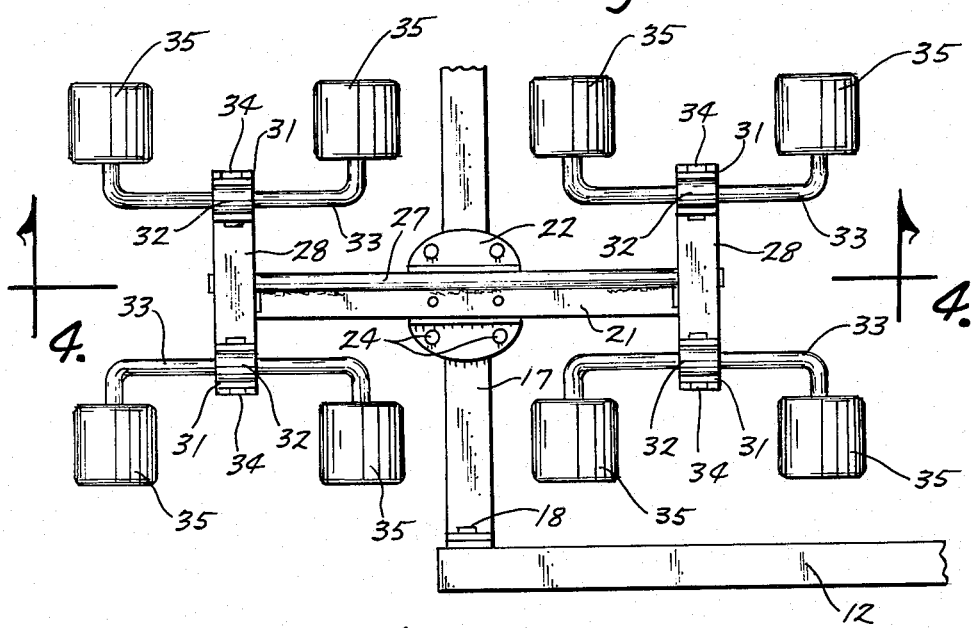
FIG. 3 is a view of one side of the roller support bracket of the present invention in a boat supporting position taken along line 3—3 of FIG. 2.

It can best be seen from FIG. 7 that when a boat is in the position shown in FIG. 7, that the front U-shaped members 33 can pivot independently of the rear U-shaped members 33 and therefore the rollers can adequately support the boat irrespective of the changes in the configuration of the boat itself along its length. Likewise, in referring to FIG. 2, it can be seen that the rollers are also pivoted and therefore self-adjusting along the axis defined by the bar 27 and thereby can quickly and automatically conform to the bottom surface 36 of any boat. Additional pivoting of the rear transverse frame member 17 along an axis defined by the bolts 18 (See FIG. 7) aids tremendously in the loading and unloading of the boat, yet allows the rollers 35 to adequately support the boat once it is loaded on the trailer as shown in FIG. 6. Accordingly, it can be seen that the illustrated embodiment of the present invention accomplishes all of the objects referred to above.

Obviously many modifications and variations of the present invention are possible in light of the above teachings. It is therefore to be understood that, within the scope of the appended claims, the invention may be practiced otherwise than as specifically described.

I claim:

1. In a wheeled trailer adapted to be connected to a prime mover, the improvement comprising:
   a frame including a pair of longitudinal members, a transverse member pivotally connected to said longitudinal members;
   a first bracket member;
   first means for pivotally mounting said first bracket member along a first longitudinal axis intermediate the ends thereof to said transverse member;
   a second bracket member;
   second means transversely spaced from said first bracket member for pivotally mounting said second bracket member along a second longitudinal axis intermediate the ends thereof to said transverse member;
   a separate generally U-shaped member pivotally mounted centrally thereof along a transverse axis to each end of said first and second bracket members; and
   a separate roller rotatably mounted on each end of said generally U-shaped members.

2. The device as defined in claim 1 having means for adjusting the vertical position of said transverse member.

3. The device as defined in claim 1 wherein the pivotal axes of the generally U-shaped members are substantially transverse with respect to the pivotal axes of said bracket members.

4. The device as defined in claim 1 having means for adjusting the lateral position of said bracket member along said transverse member.

5. The device as defined in claim 1 wherein a third bracket member is pivotally mounted to said transverse member along the first said substantially longitudinal axis;
   a fourth bracket member is pivotally mounted to said transverse member along said second substantially longitudinal axis;
   a separate generally U-shaped member being pivotally attached respectively to each end of said third bracket member;
   a separate generally U-shaped member being pivotally attached respectively to each end of said fourth bracket member; and
   a roller being rotatably mounted on each end of the generally U-shaped members which are attached to the third and fourth bracket members.

6. The device as defined in claim 5 including means for adjusting the vertical position of said transverse member with respect to said longitudinal members.

7. The device as defined in claim 6 including means for adjusting the lateral position of said first and third bracket members on said transverse member; and
   means for adjusting the lateral position of said second and fourth bracket members on said transverse member.

8. A wheeled trailer for transporting boats or the like, comprising:
   frame means connected to ground engaging wheels;
   a pair of longitudinally extended, parallel, transversely spaced members being rigidly and non-rotatably attached to the frame means;
   a member transversely extended between common rear ends of said longitudinal members;
   means connecting each end of said transverse member to said rear ends for selective, vertically adjusted positions of said transverse frame member relative to said rear ends, said connecting means comprising:
   bracket means attached substantially normally to each end of said transverse member;
   first aperature means formed in each of said bracket means of said transverse member;
   second aperature means formed on the ends of each of said longitudinal members for mating with said first aperature means;
   one of said first and second aperature means comprising a plurality of aperatures; and
   means for selectively extending through mating aperatures of said first and second aperature means for pivotally securing the transverse member to the longitudinal members; and
   means engageable with the hull of a boat to be carried on the trailer, said hull engaging means detachably connected to said transverse member for selective horizontally adjusted positions thereon.

9. A wheeled trailer as described in claim 8, and further wherein said hull engaging means includes a plurality of pairs of hull engaging rollers, the rollers mounted on parallel axes, and each pair of rollers pivotally mounted to a bracket portion of said hull engaging means.

10. A wheeled trailer as described in claim 9, and further wherein said bracket portion is also pivotally mounted relative to said transverse member, the pivoting axis of said each pair of rollers extended normal to the pivoting axis of each bracket portion.

* * * * *